June 17, 1958 — H. ACKERS — 2,839,180
FLEXIBLE CONVEYOR BELTS
Filed Oct. 25, 1954
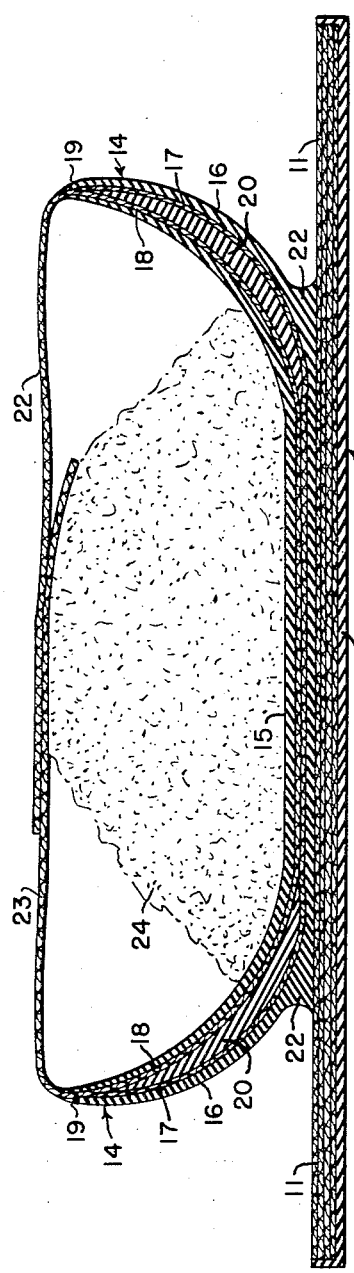
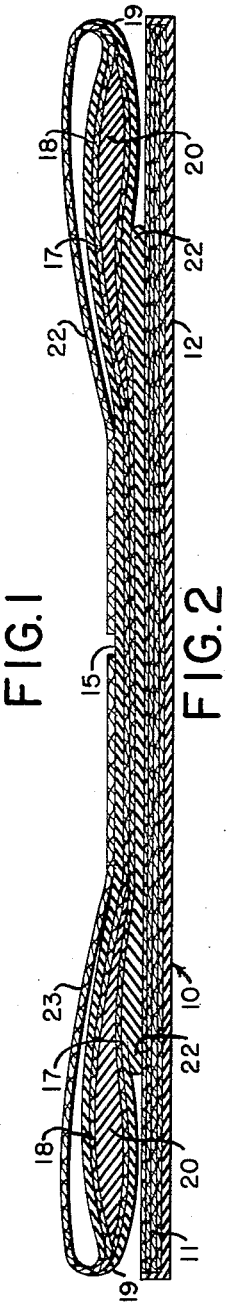
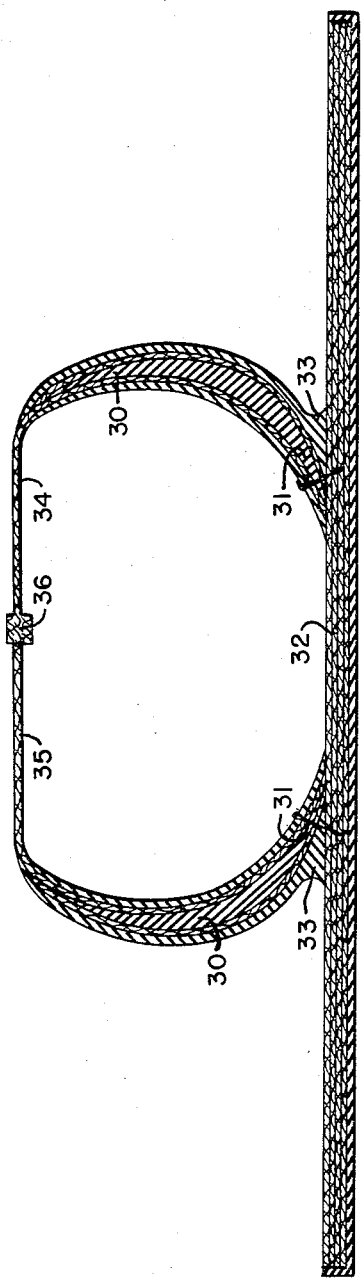
INVENTOR
HARY ACKERS United States Patent Office 2,839,180
Patented June 17, 1958

2,839,180

FLEXIBLE CONVEYOR BELTS

Harry Ackers, Leyland, England, assignor to BTR Industries Limited, a British company, and Rownson, Drew & Clydesdale Limited, London, England, a British company Application October 25, 1954, Serial No. 464,457

Claims priority, application Great Britain October 28, 1953

1 Claim. (Cl. 198—201)

The invention relates to conveyor belts and has for its object the provision of a belt which is particularly suited to the conveyance of material in powder or granular form or otherwise composed of small pieces or particles.

The invention provides a flexible conveyor belt which, in section, is of channel form, the base of the channel leading into the sides of the channel through smooth curves and the curves being sufficiently flexible and resilient to enable the belt to pass around a drum or pulley.

More specifically the invention provides a flexible conveyor belt which, when free and unconstrained, is of channel form in section, the base of the channel leading into the sides of the channel through smooth curves which are sufficiently flexible and resilient to enable the sides of the channel to flatten towards the plane of the base thereby to facilitate passage of the belt around a drum or pulley.

The curves, which are preferably of substantial radii, may continue throughout substantially the whole of the sides.

In a preferred form of the belt the curved portions aforesaid are constructed of two (or more) plies of flexible reinforcement (preferably textile fabric) embedded in rubber or like flexible material such as polyvinyl chloride and separated by fillets of rubber or like material. In a practical construction of the belt the fillets are of lune shape in section.

In cases where it is desired to provide additional means for holding the material within the belt, the belt may have flexible flaps constructed as continuations of the sides of the channel and arranged to overlie the channel. The flaps may be of sufficient width partly to overlie one another. Alternatively they may be provided with fastener means to secure their edges together.

It is a feature of one form of the invention that the base of the channel is secured to a carrier belt.

Two specific constructions of conveyor belts according to the invention and particularly suited to the conveyance of powder will now be described by way of example and with reference to the accompanying drawings, in which:

Figure 1 is a section showing one of the belts loaded;

Figure 2 is a section showing the belt as it passes, unloaded, around the drum; and Figure 3 is a section showing a second construction of belt.

The belt forming the subject of the first example shown in Figures 1–3 is constructed in two parts which are secured together by a bond of rubber. One part consists of a flat carrier belt 10 comprising layers of rubberised textile fabric having, on one face, a rubber covering layer 12. The other part 14 is of channel section, the base 15 of the channel leading into the sides through smooth curves 16 which are of substantial radii and extend substantially to the tops of the sides. Each curve extends around an arc of approximately 90°. Extending throughout the base and sides of the channel there are two plies 17, 18 of a rubberised textile fabric. Over the base 15 of the channel and at the free edges 19 of the sides the two plies are separated by only a thin lay of rubber. Over the curved portions 16 of the section the plies are separated by rubber fillets 20 of lune form, the rubber being tough and elastic and tending to maintain the channel or trough formation of the belt. The reinforcing layers 17, 18 are covered by rubber and the outer surface of the base of the channel is bonded by means of this rubber to the surface of the carrier belt. The channel is positioned symmetrically in relation to the carrier belt and the widths of the two belts are such that when the sides of the conveyor belt are flattened (as shown in Figure 2) the edges of the two belts are then substantially coincident.

Small beads or fillets 22 of soft rubber are provided between the external surfaces of the curves 16 and the carrier belt 10 to prevent powder or other material accumulating in the crevices between the two parts of the belt. The beads also provide additional resilience to support the belt in its channel form.

In order to provide a cover for the channel the free edges of the sides of the channel are extended to constitute flexible flaps 22, 23 which may fold over the channel. To constitute a reinforcement for the flaps the ply 18 of the main reinforcement is extended into the material of the flaps. In the drawing, Figure 1, the flaps are shown over a pile of powder 24 on the belt.

Figure 3 shows a second construction of belt. In this construction the sides 30 and curved parts 31 are constructed separately from the base, which in this example is provided by a carrier belt 32 extending outwardly beyond the points of attachment of the curved parts. Beads 33 are provided as in the previous construction. The belt has flaps 34, 35 which, in this example, have a continuous fastener 36 by which the edges of the flaps may be secured together. This fastener is of the construction described in British specification No. 709,701 and, in use is secured by a slider after powder or material has been loaded onto the belt at a loading station and is released at an unloading station.

The invention is not restricted to the detailed features of the above examples. For instance it is within the invention to provide a conveyor belt of channel form as above described without the use of a carrier belt. Further it is to be appreciated that the expression "rubber" as used herein is intended to include natural and synthetic rubber as well as other rubber-like plastics. If desired additional reinforcement may be included in the belt. For example, there may be longitudinally extending cords or wires to give the belt additional strength in the longitudinal direction. Furthermore other means such as stitching or clips may be employed as an alternative or an addition to bonding to secure the two parts of the belt together.

I claim:

A flexible conveyor belt comprising a body which, when free and unconstrained, has a section of channel form providing a flat base and upstanding side walls with the base of the channel leading internally and externally into the side walls through portions of smooth curvature of substantial radius, which portions and side walls are both sufficiently stiff that the sides are self-supporting and sufficiently flexible to enable the side walls of the channel to flatten, by increase in the radius of curvature of said portions, outwardly and towards the plane of the base thereby to facilitate passage of the belt around a drum and, flexibly attached to the free edges of the two side walls of the body respectively, two inwardly extending flexible flaps which form continuations of the side walls and overlie the channel when the side walls are upstanding and when the side walls are bent outwardly towards the plane of the base as aforesaid still extend inwardly and lie against at least the inner surfaces of the side walls.

References Cited in the file of this patent

UNITED STATES PATENTS

| | | |
|---|---|---|
| 381,456 | Woodbury | Apr. 17, 1888 |
| 2,365,762 | Johns et al. | Dec. 26, 1944 |

FOREIGN PATENTS

| | | |
|---|---|---|
| 268,133 | Great Britain | Mar. 31, 1927 |